United States Patent [19]

Einsle et al.

[11] Patent Number: 4,689,943
[45] Date of Patent: Sep. 1, 1987

[54] PAY-OUT STAND FOR SUPPLY REELS

[75] Inventors: Guenter Einsle, Munich; Ernst Mayr, Starnberg; Ulrich Oestreich, Munich; Gernot Schöeber; Wolfgang Schrey, both of Munich, all of Fed. Rep. of Germany

[73] Assignee: Siemens Aktiengesellschaft, Berlin and Munich, Fed. Rep. of Germany

[21] Appl. No.: 821,251

[22] Filed: Jan. 22, 1986

[30] Foreign Application Priority Data

Feb. 5, 1985 [DE] Fed. Rep. of Germany ....... 3503843

[51] Int. Cl.⁴ ............... G02B 5/16; G01H 13/04; D07B 3/06
[52] U.S. Cl. ....................... 57/90; 242/130; 57/352; 57/6
[58] Field of Search .................. 57/3, 6, 9, 12, 16, 57/17, 18, 11, 13, 90, 261, 281, 299, 352; 242/35.6 R, 130, 131, 134

[56] References Cited

U.S. PATENT DOCUMENTS

| 2,961,185 | 11/1960 | Seigle | 242/130 |
| 4,237,687 | 12/1980 | Vecchis et al. | 57/13 X |
| 4,411,130 | 10/1983 | Dubois et al. | 57/6 X |
| 4,497,164 | 2/1985 | Dotti et al. | 57/13 X |
| 4,607,481 | 8/1986 | Bell et al. | 57/13 X |

FOREIGN PATENT DOCUMENTS

G8319129.1 12/1983 Fed. Rep. of Germany.

Primary Examiner—Donald Watkins
Attorney, Agent, or Firm—Hill, Van Santen, Steadman & Simpson

[57] ABSTRACT

A pay-out stand for supply reels utilized in manufacturing cables particularly light waveguide cables having a basket-like structure mounted for rotation around a horizontal axis with carrier members extending parallel to the axis adjacent the periphery of the basket-like members. The supply reels are situated on the inside of each carrier part, preferably in pairs, and the carrier parts are spaced so that access of the supply reels can be had from the outside of the stand to enable splicing the lead from a backup reel to a waveguide of a feed reel which is feeding a lead out of the pay-out stand.

2 Claims, 3 Drawing Figures

PAY-OUT STAND FOR SUPPLY REELS

BACKGROUND OF THE INVENTION

The invention is directed to a rotatably designed pay-out stand for supply reels for use in the manufacture of light waveguide bundles or cables.

German Gebrauchsmuster No. 83 19 129 discloses a take-off apparatus for leads from reels in which a plurality of mounts for reels are situated along an edge of a turntable. Drive motors for each of the reels are provided in the circumferential region outside of the turntable and the pickup of the material to be unwound occurs by means of a funnel which is located above the turntable. However, only one element is taken off at a line and all the other mounts serve for pre-equipping.

It is desirable that the work be continuously carried out during the manufacture of cable leads or lead bundles. This presumes that the pre-spliced reel can be respectively prepared so that a change can be quickly and reliably carried out. Moreover, it should be assured that the accessibility of the supply reels in the region of the pay-out stand is always adequately guaranteed for the operator.

SUMMARY OF THE INVENTION

The object of the present invention is to create an improved pay-out stand for supplying a plurality of light waveguide fibers issuing simultaneously, which stand is particularly well suited for an interruption-free manufacturing mode and for a simple and reliable re-insertion. To accomplish these goals, the present invention is directed to an improvement in a pay-out stand for supply reels for the manufacture of light waveguide bundles or cables, said pay-out stand having a structure which is constructed for rotation. The improvements are that the structure having means forming a back portion with a plurality of points lying on a circle concentric with a horizontal axis of rotation for the stand and a plurality of carrier parts with one carrier part for each point on the circle, said carrier parts extending from the points parallel to the horizontal axis, each carrier part supporting at least one supply reel for the light waveguide with one supply reel of each carrier part being a feed reel capable of having its waveguide being struck off overhead simultaneously with other waveguides and being brought into a position which is required for forming the cable and the remaining reels being backup reels which can be brought into position for connection of the waveguide of the backup reel to the waveguide of the feed reel without disturbing the pay-out of the waveguide from the feed reel. This manner of design of the pay-out stand has the advantage that the low end of each of the running fibers can be stranded in a simple fashion with the upper end of the re-inserted fiber without a welding device and a re-coating device for splicing fibers having to be moved and without the operation of the fibers being pay-out in parallel being disturbed.

Depending on the running length of the fiber, the stand is rotated into a respectively required position in an entirely arbitrary fashion. All required fibers are constantly paid out. Since the fibers are of different lengths, the respective fiber which is to be re-inserted and welded as the next fiber cannot be predetermined.

Other objects and developments of the present invention will be readily apparent from the drawings and following description.

DESCRIPTION OF THE PREFERRED EMBODIMENTS

The principles of the present invention are particularly useful when incorporated in a pay-out stand AG which is mounted with a horizontal axis of rotation HA. Overall, the pay-out stand AG comprises a roughly basket-shaped structure having a roughly disk-shaped center part MT, which is provided on its outer circumference with carrier parts TT which extend in the axial direction AH. The structure of the pay-out stand AG can occur in a closed form or on the other hand the center part MT may comprise a plurality of spoke-like struts proceeding radially outwardly from the axis with the ends forming points which lie on a concentric circle and are connected to the carrier parts TT.

Figure 1:
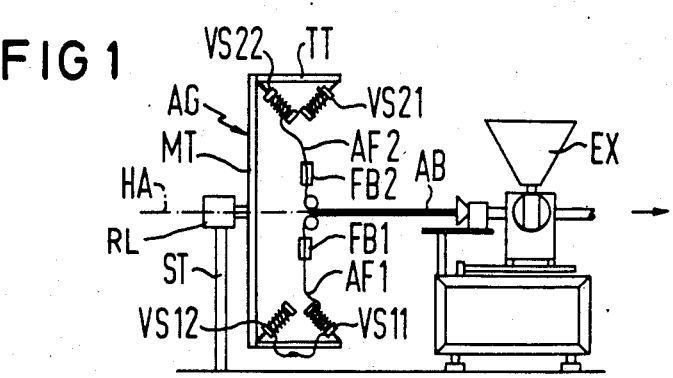
FIG. 1 is a side view of a structure of a starting position of a bundle lead with a pay-out stand constructed in accordance with the present invention.
Figure 2:
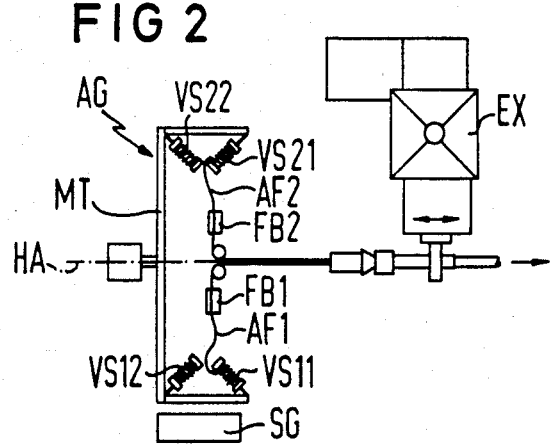
FIG. 2 is a top plan view of the arrangement of FIG. 1.
Figure 3:
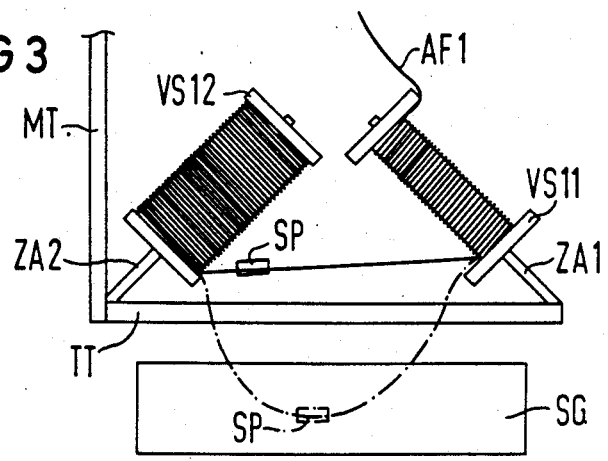
FIG. 3 is an enlarged view of the details of the allocation between two supply reels.

Supply reels are held on the inside of the basket-shaped pay-out stand AG, namely, via restraining pins or supports ZA1 and ZA2 which are illustrated in FIG. 3 and are secured to the carrier part TT. The supply reels are applied in pairs along a generated line so that the longitudinal axis of the supply reels forming one pair, for example, supply reels VS11 and VS12 as well as the pair VS21 and VS22, extend obliquely relative to one another and meet on the inside of the pay-out stand AG. In order to simplify the illustration, only the upper pair of supply reels VS21 and VS22 as well as the lower pair VS11 and VS12 have been shown with the remaining supply reels and carrier parts being admitted for purposes of simplifying the illustration.

One of the supply reels of each pair which is illustrated by the supply reels VS11 and VS22 in the present example is a feed reel and has its optical conductor AF1 or, respectively, AF2, extending overhead to be paid out through a fiber-braking device FB1 and FB2 respectively. The individual fiber-shaped basic components are combined into a bundle AB by roller elements. The bundle is then taken in a horizontal direction to an extruder EX.

The connection between the ends of the first supply reel or feed reel VS11 which is paying out just overhead and the beginning of the following reel VS12 which is the backup reel for continuous operation can be carried out by the operator in a simple way because the supply reels cam be respectively rotated into a welding position and are easily accessible from the outside for the operator. A splicing and welding device SG can be stationarily situated outside of the pay-out stand and is schematically illustrated in FIG. 3. The replacement of the empty reel can also be easily undertaken during the running operation in the same way. After the welding process and the restoration of a coating which is illustrated in dot-dash lines in FIG. 3, the supply reel VS11, which is now not running, is turned until the splice connection SP lies slightly in tension. The necessity of special support mounts for the splice is thus eliminated.

The light waveguide leads, which are combined to form a bundle AB, are combined via rollers and are supplied to an extruder EX. In the extruder EX the leads or waveguides which have been combined in the bundle are provided with a cladding or are further processed in some other way.

The rotatable structure of the pay-out stand AG can be advantageously secured relative to a frame ST which is connected to the floor. This securing can be done by means of a releasable latch RL so that the structure is non-displaceable from its position during the splicing of the waveguides.

The fiber-braking devices, which work with a fluid agent for waveguide or lead guidance, can be advantageously employed as the fiber-braking devices FB1 and FB2. Such devices are disclosed in a greater degree in the copending U.S. patent application Ser. No. 711,359, filed Mar. 13, 1985 and the disclosure that the copending application is incorporated by reference thereto.

Although various minor modifications may be suggested by those versed in the art, it should be understood that we wish to embody within the scope of the patent granted hereon, all such modifications as reasonably and properly come within the scope of our contribution to the art.

We claim:

1. In a pay-out stand for supply reels for the manufacture of light waveguide bundles or cables, said pay-out stand having a structure, which is constructed for rotation and has means forming a back portion with a plurality of points lying in a circle concentric with a horizontal axis of rotation of the stand and a plurality of carrier parts with one carrier part for each point on the circle, said carrier parts extending from said points of the circle and being substantially parallel to the horizontal axis, the improvement comprising each of said carrier parts having means for supporting two supply reels arranged in pairs for the light waveguide with a first supply reel of each pair being a feed reel capable of having its light waveguide being struck off overhead simultaneously with the waveguides of the feed reels of the other carrier parts and said waveguides being brought into a position required for forming the cable, a second reel of the pair being a backup reel, said pay-out stand forming a rotatable structure with its relevant feed and backup reels being also rotatable in an accessible position from the outside for an operator to splice the waveguide of the backup reel to the waveguide of the feed reel during the running operation of manufacture of the light waveguide bundles or cables without disturbing the pay-out of the waveguide from the feed reel, said rotatable structure being in a non-displaceable position during the splicing of the waveguides, said means for supporting enabling each of the supply reels to be manually rotated to produce sufficient slack to enable splicing the waveguide of the backup reel to the waveguide of the feed reel and the then rotate the backup reel to place the splice under tension so that a separate support for the splice is not required, said means for supporting of each carrier part having a pair of retaining pins for receiving the pair of supply reels, said pair of pins extending obliquely relative to one another and being directed inwardly from the carrier part toward a common guide and braking device so that the longitudinal axis of each reel of the pair extends obliquely relative to each other and inwardly toward the common guide and braking device, and said carrier parts being constructed to enable accessibility from the outside of the pay-out stand.

2. In a pay-out stand according to claim 1, which includes a latching device for latching the structure of the lay-out stand to hold the reels in a fixed position during splicing.

* * * * *